United States Patent [19]

McAlpine

[11] 4,123,311
[45] Oct. 31, 1978

[54] MACHINE FOR WRAPPING BATTERY PLATES

[75] Inventor: Charles H. McAlpine, Coloma, Mich.

[73] Assignee: Mac Engineering & Equipment Company, Inc., Benton Harbor, Mich.

[21] Appl. No.: 657,693

[22] Filed: Feb. 12, 1976

Related U.S. Application Data

[63] Continuation of Ser. No. 543,518, Jan. 23, 1975, abandoned.

[51] Int. Cl.² ............................................. B32B 31/20
[52] U.S. Cl. .................................. 156/443; 156/499; 156/517; 156/568; 156/581
[58] Field of Search ............... 156/212, 213, 216, 227, 156/443, 497, 499, 517, 567, 568, 581; 429/136, 139

[56] References Cited

U.S. PATENT DOCUMENTS

| | | | |
|---|---|---|---|
| 3,488,244 | 1/1970 | Lepisto | 156/497 |
| 3,669,805 | 6/1972 | Engvoll | 156/567 |
| 3,892,620 | 7/1975 | Hevssy | 156/443 |
| 3,900,341 | 8/1975 | Shoichiro et al. | 429/139 |

*Primary Examiner*—Charles E. Van Horn
*Assistant Examiner*—Basil J. Lewris
*Attorney, Agent, or Firm*—Austin A. Webb

[57] ABSTRACT

Newly formed battery plates are fed singly edgewise into radially open pockets in a first transfer wheel, while a like number of wrapper sheets are folded in half and pressed radially into pockets in a second transfer and sealing wheel. Vacuum plates in the sides of the pockets in the second transfer wheel hold the wrapper sheets open. Both wheels rotate step by step, and each plate is released to fall by gravity between folded sides of each wrapper. Centering rails carried around segment of second wheel pass through notches in edges of wrapper sheet to center battery plate in wrapper. Plates and wrappers carried by second wheel then pass hot air jets to soften edge of wrapper sheet; after which clamp blades carried by sides of vacuum plates are cammed closed to seal side edges of wrapper sheets over side edges of each plate. Clamp plates then open, and wrapped battery plate is released and delivered by gravity from second transfer wheel to off-feeding conveyor.

2 Claims, 10 Drawing Figures

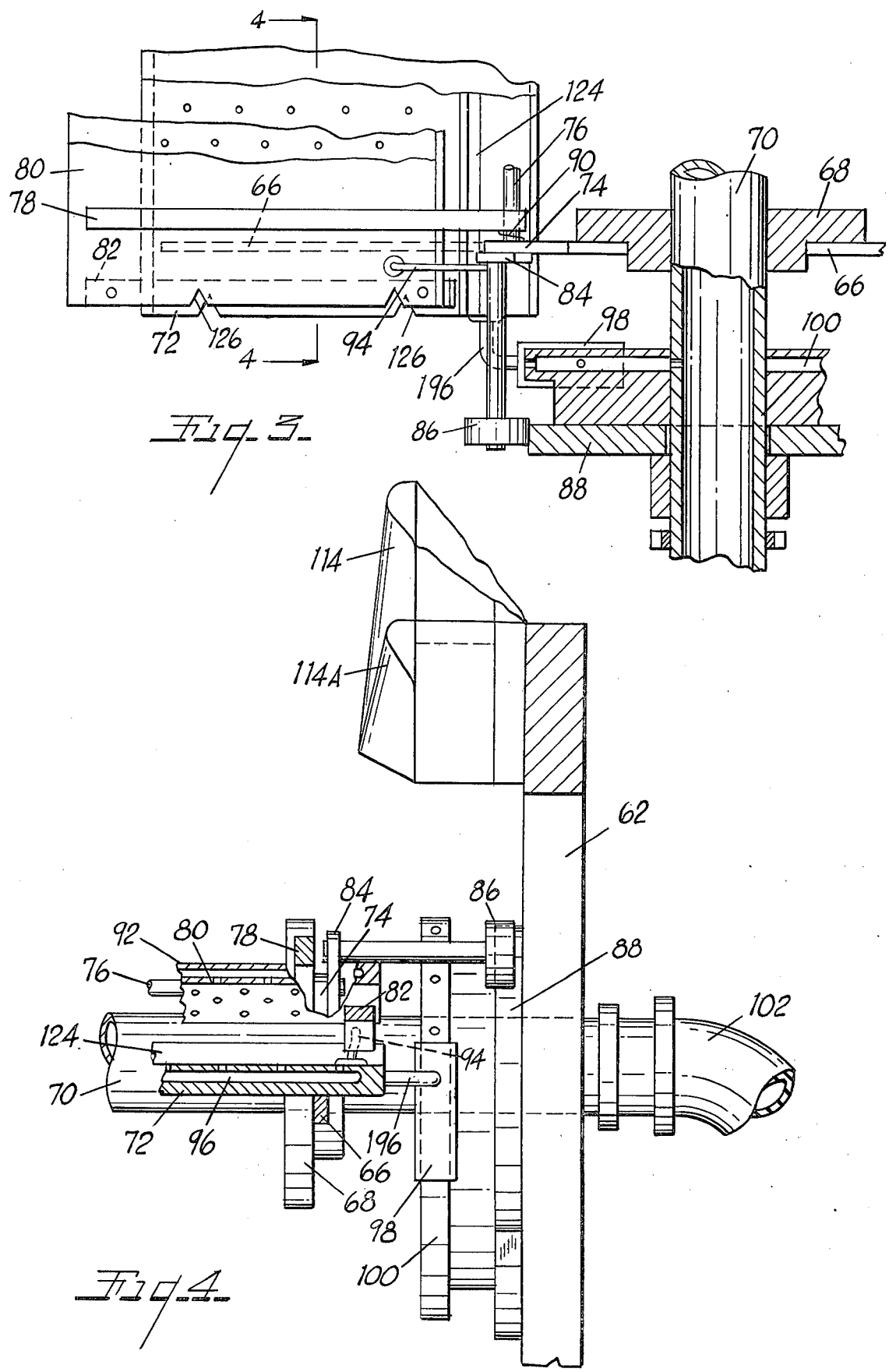

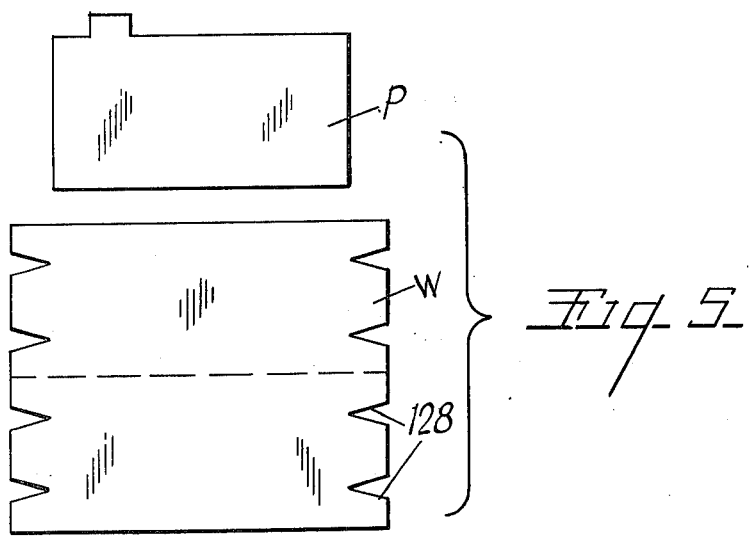
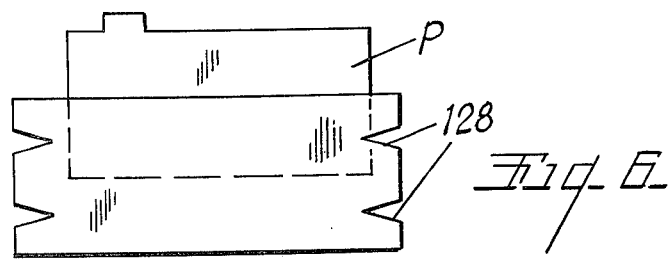
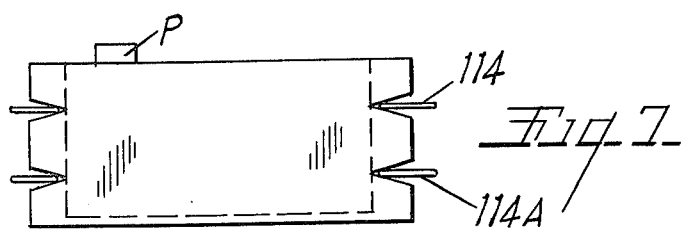
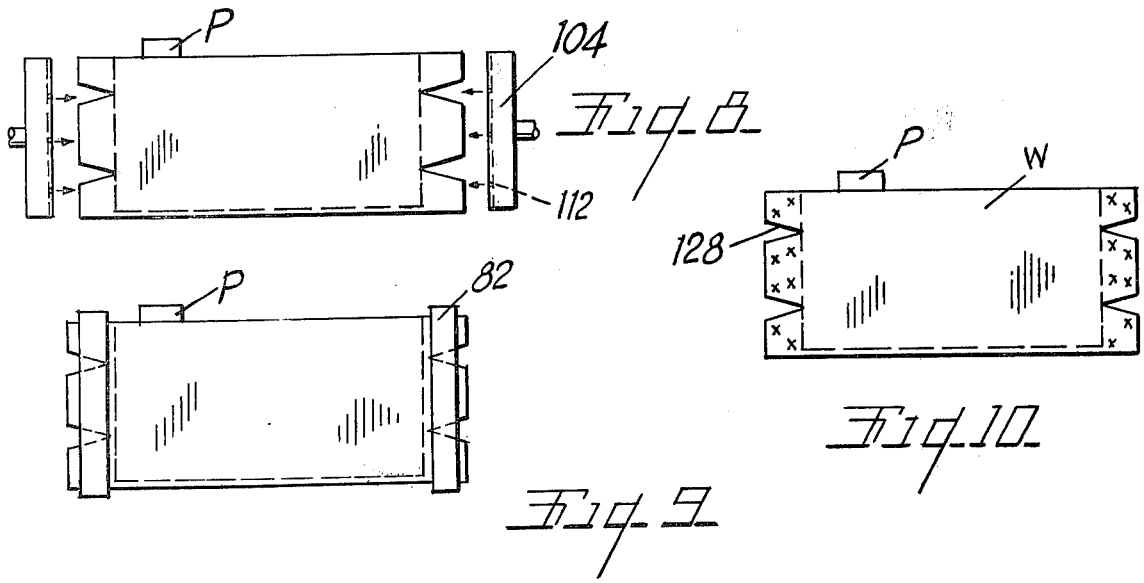

MACHINE FOR WRAPPING BATTERY PLATES

This is a continuation of application Ser. No. 543,518, filed Jan. 23, 1975 now abandoned.

DESCRIPTION

The drawings, of which there are four sheets, illustrate a preferred form of the apparatus and its method of operation.

FIG. 3 is a fragmentary radial cross sectional view of the second sealing wheel on line 3—3 in FIG. 2.

FIG. 4 is a fragmentary cross sectional view taken along lines 4—4 in FIGS. 2 and 3.

FIG. 5 is a plan view of a battery plate and a wrapper sheet as the two articles are delivered to the machine.

FIG. 6 is a plan view of a folded wrapper sheet with a battery plate partially nested in the fold of the wrapper at an intermediate stage of the operation of the apparatus.

FIG. 7 is a view of the plate centering portion of the apparatus.

FIG. 8 is a view of the wrapper sheet heating and softening portion of the apparatus.

FIG. 9 is a view of the sheet edge sealing portion of the apparatus.

FIG. 10 is an elevational view of the wrapped battery plate produced by the apparatus.

OUTLINE OF INVENTION

It has recently been proposed to eliminate the divider sheets between the positive and negative plates of wet batteries, by wrapping the positive battery plates between the sides of a single folded porous separator sheet. The present invention improves upon the plate wrapping process by rapidly and accurately locating each positive plate in the fold of a wrapper sheet, centering the plates between notched side edges of the wrapper sheet, and sealing the side edges of the wrapper sheet over the side edges of the plate. The wrapped positive plate is thus ready for assembly into lapped relation with negative plates, and is protected along its bottom and side edges against shorting contact with crystalline growth from the edges of the negative plates, and from shorting by particles sluffed off from the plate in use.

Figure 1:
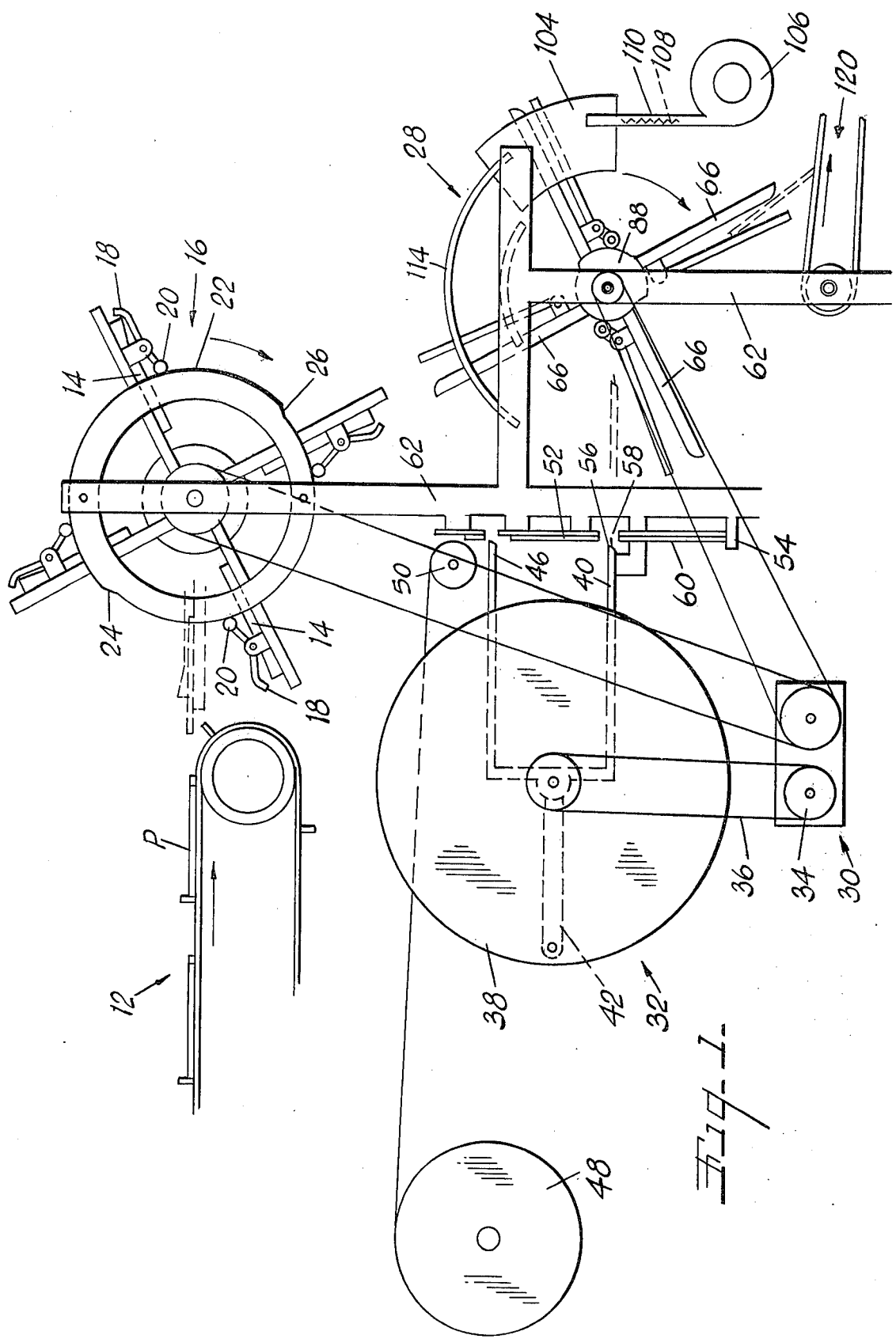
FIG. 1 is a side elevational view of the apparatus.

The general arrangement of the apparatus appears in FIG. 1 where a supply conveyor 12 delivers newly formed positive battery plates P. The plates are delivered, top edge first, into pockets 14 arranged radially around a first or plate transfer wheel indicated generally by the reference numeral 16. The wheel is rotated step-by-step in a clockwise manner as will be described. Retaining jaws 18 mounted on each pocket have follower rolls 20 which engage the cam ring 22 and open the jaws for reception of the plates from the conveyor 12. After the pocket is elevated, to let the plate fall fully into the pocket by gravity, a lift 24 on the cam ring closes the jaws 18, and retains the plate in the pocket until released by the receding cam surface 26 when the pocket is in downwardly inclined position, and in registering relation to the end of a pocket in a second transfer wheel indicated generally by the numeral 28.

The numeral 30 generally indicates a step-by-step intermittent drive for the transfer wheels 16 and 28, and a wrapper sheet cutting and folding mechanism indicated generally at 32. A drive wheel 34 drives belt 36 and in turn drives a crank wheel 38 which reciprocates a stuffer blade 40 by means of the connecting rod 42. The rod also reciprocates a cut-off blade 46 which cuts a wrapper sheet W of proper length from the end of a supply roll 48. Feed roll 50 feeds a length of wrapper material downwardly under side guides 52 and against a stop 54, after which the blades are actuated. The stuffer blade may have small needles 56 to assure that the wrapper sheet will fold in the middle as it is pulled from under the guides and stuffed into the wheel 28, through a folding slot 58 in the backing plate 60. The numeral 62 indicates parts of a supporting frame for the elements of the apparatus.

Figure 2:
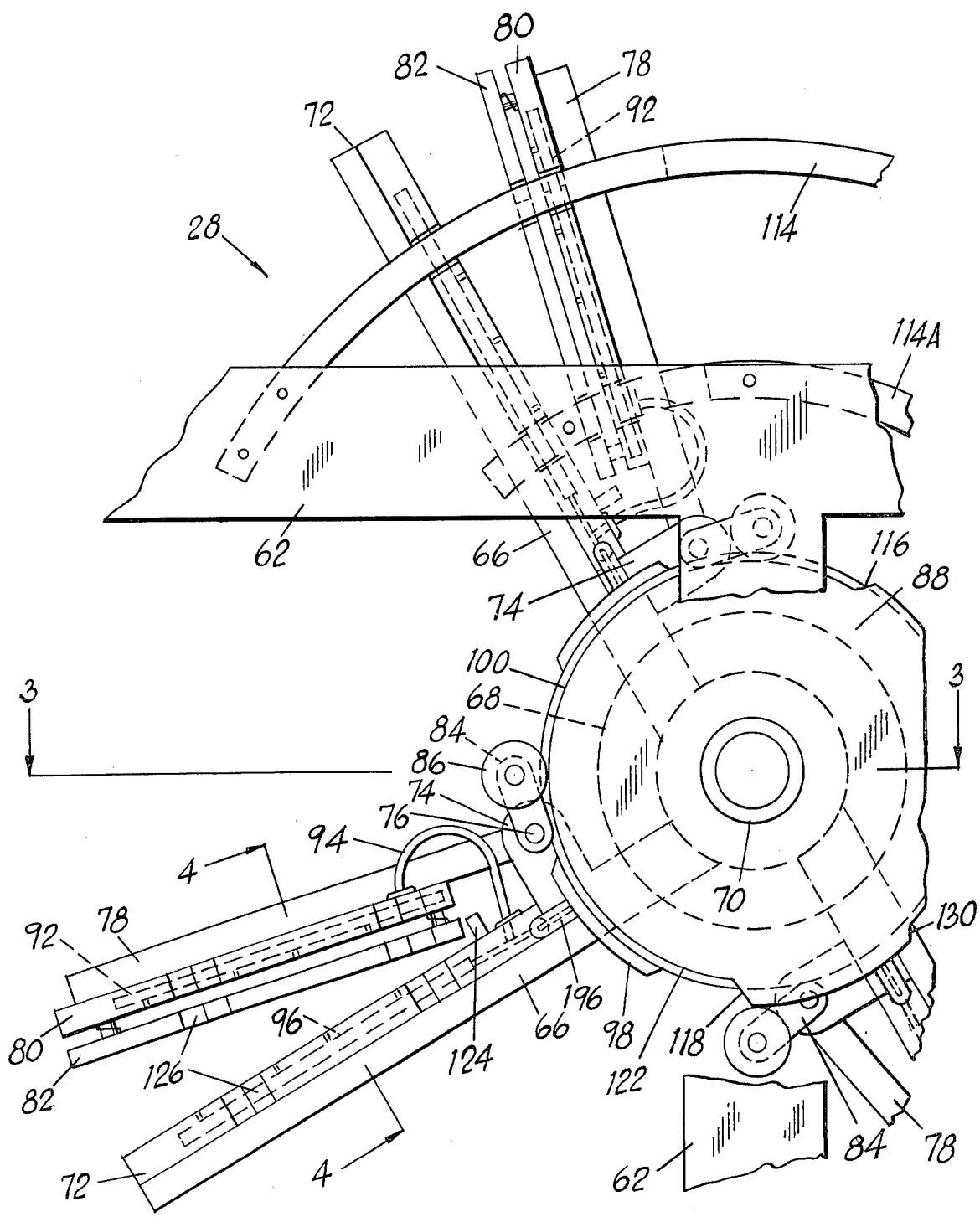
FIG. 2 is a fragmentary, enlarged, side elevational view of the second plate wrapping and transfer wheel.

The second transfer and sealing wheel 28 is shown more clearly in FIGS. 2, 3 and 4. Arms or spokes 66 are carried in pairs by hubs 68 near opposite ends of a hollow shaft 70 (only one end of the drum-like wheel is illustrated). Each pair of arms carries a trailng plate 72 and a pivot ear 74 which projects ahead of the plate and radially inwardly therefrom. A rock shaft 76 extends between each pair of ears and carries clamp arms 78. The arms 78 support a suction plate 80, with spring pressed clamp and seal bars 82 on each side. The rock shafts 76 have cam arms 84 on each end, and the arms carry follower rolls 86 that are advanced along cam rings 88 as the wheel rotates. The arms 78 and rock shafts 76 are biased to open position of the suction plates 80 as by coil springs 90 wrapped around the ends of the rock shafts and engaged with the arms 78 and the ears 74 (see FIG. 3).

A housing 92 on the leading side of each suction plate 80 is connected by a flexible conduit 94 to a suction chamber 96 in the associated plate 72; and the two suction chambers are connected by pipes 196 to shoes 98 which advance around a fixed manifold 100 as the plates advance. The manifold is connected through the hollow shaft to a source of vacuum (not illustrated) by the hose 102.

Positioned along the upper right hand sector (see FIGS. 1 and 2) of the ends of the second transfer wheel 28 are nozzle or jet housings 104. Air from a blower 106 is heated by a heating element 108 in pipe 110 and directed through openings 112 against the edges of the wrapper sheet to soften the thermoplastic in the sheet.

Arcuate plate centering cams 114 carried by the frame 62 center the battery plate P in the wrapper prior to the plate reaching the heated air jets. After passing the heated air jets, the follower rolls 86 engage the lift 116 on cam 88 to press the clamp and seal plates 82 against the heated edges and seal them together against the plate 72. As each pair of plates approaches a downward and rearwardly inclined position, the follower rolls retract inwardly along the receding surface 118 on cam 88 to open the opposed plates 72 and 80 and permit the wrapped and sealed plate to be delivered by gravity to the off-feeding conveyor 120.

Sequence Of Operation

As each opposed pair of vacuum plates 72 and 80 arrives in horizontal position opposite the wrapper feed blade 40, the plates are held open by engagement of the follower roll 86 with the surface 122 on the cam 88. Also the vacuum shoe 98 registers with a passage from the vacuum chamber 100. The wrapper folding blade 40 inserts the wrapper sheet, folded in the middle, against stop 124, and the vacuum hold the folded sheet open until the plates advance to under the plate transfer wheel 16. Note from FIGS. 5 to 10 that the edges of the wrapper sheet W are notched as at 126. After the plate P is dropped into the folded wrapper, the arcuate cams 114 and 114A, said cams consisting of a pair of segmental arcuate rails arranged around each end of the transfer wheel 28 and have edges converging axially of the wheel to enter into the notches and transversely center the plate in the folded wrapper. The plates 72 and 80 are notched as at 126 to pass the centering cams, and the wrapper with the plate centered therein next advances past the heated air jets from the nozzle plate 104. After the edges of the wrapper are rendered soft and tacky by the hot air, the plate 80 is closed toward the plate 72, and the sealing plates 82 press the heated edges together to seal the sides of the wrapper around the battery plate. The wrapped plate is then discharged from the transfer wheel when the cam roll 86 reaches the retracting surface 118.

Details of the structure can be altered without departing from the theory of the invention. The essential steps are to provide a wrapper sheet of porous material having notched edges and thermo plastic sealing content. Next fold the sheet in the middle and insert it between the plates 72 and 80 the vacuum surfaces of which hold the folded sides of the sheet open until the battery plate P is dropped or inserted into the fold. Next transversely center the plate in the wrapper by the cam guides operating through the notches 126 and 128. Next partially close the plates 82 on the plates 72 by engagement of the follower rolls 84 with the cam lift 116 to bring the folded edges of the wrapper together. Next heat the edges of the wrapper; and then seal them against each other by further closing the plates by the cam lift 130. The coacting plates including the edge clamp plates 82 are held close together as they approach their downwardly inclined position, and after sealing the edges of the wrapper, open as previously described to release the wrapped plate.

What is claimed as new is:

1. Battery plate wrapping apparatus comprising
   a wrapping and sealing wheel having radially disposed pairs of opposed plates having suction surfaces,
   one plate of each pair being swingable toward and away from the other,
   means for advancing said wheel in a step-by-step motion to four consecutive stations,
   means for inserting a folded wrapper sheet between the plates of said pairs of plates with the folded edge of the sheet inwardly and centered axially of the wheel at a first receiving station,
   each side of the folded sheet having a single spaced pair of registering notches in each folded half thereof,
   means for inserting a battery plate between the folds of said wrapper at a second station, said pairs of plates being in upwardly opening position at this station,
   means responsive to rotation of said wheel to admit vacuum to said vacuum surfaces of said plates from in advance of said first station to behind said second station,
   pairs of segmental arcuate rails arranged around each end of a sector of said wheel extending from the exit of said first station to a third station
   said rails having edges converging axially of said wheel to enter into the notches in said wrapper and center said battery plate between the side edges of said wrapper,
   the side edges of said pairs of plates having notches formed therein clearing said rails,
   means for heating said wrapper at said third station,
   cam means responsive to rotation of said wheel past said third station to close the plates of said pairs of plates into gripping and retaining engagement with the wrapper and battery plate enclosed therein,
   means for sealing the projecting edges of said wrapper sheets,
   said sealing means being actuated by the closing of said plates,
   and cam means responsive to rotation of said wheel to open said pairs of plates and release said wrapper plates at a fourth station.

2. Battery plate wrapping apparatus as defined in claim 1 in which said means for inserting said wrapper sheet comprises
   a guide plate located vertically alongside of said wheel at said first station and defining a horizontal slot,
   means for delivering said wrapper sheet along side guide plate until the middle of the wrapper is opposite said slot,
   and a reciprocable presser plate arranged to press the center of the sheet through said slot and to between a pair of said plates on said wheel.

* * * * *